(12) United States Patent
Bavishi et al.

(10) Patent No.: US 11,449,419 B2
(45) Date of Patent: Sep. 20, 2022

(54) DISASSOCIATING MEMORY UNITS WITH A HOST SYSTEM

(71) Applicant: Micron Technology, Inc., Boise, ID (US)

(72) Inventors: Dhawal Bavishi, San Jose, CA (US); Zhenlei Shen, Milpitas, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/995,668

(22) Filed: Aug. 17, 2020

(65) Prior Publication Data
US 2022/0050775 A1 Feb. 17, 2022

(51) Int. Cl.
*G06F 12/06* (2006.01)
*G06F 12/0831* (2016.01)
*G06F 12/14* (2006.01)
*G06F 12/0886* (2016.01)

(52) U.S. Cl.
CPC ...... *G06F 12/0653* (2013.01); *G06F 12/0833* (2013.01); *G06F 12/0886* (2013.01); *G06F 12/1441* (2013.01); *G06F 2212/7201* (2013.01)

(58) Field of Classification Search
CPC ............ G06F 12/0653; G06F 12/0833; G06F 12/0886; G06F 12/1441; G06F 2212/7201
See application file for complete search history.

(56) References Cited

U.S. PATENT DOCUMENTS

| | | | |
|---|---|---|---|
| 6,625,710 B2 * | 9/2003 | Bonola | G06F 12/023 711/171 |
| 2003/0131077 A1 * | 7/2003 | Hogan | H04L 41/0813 709/220 |
| 2005/0021562 A1 * | 1/2005 | Idei | G06F 3/0631 |
| 2012/0185661 A1 * | 7/2012 | Desai | G06F 12/1491 711/163 |
| 2016/0179432 A1 * | 6/2016 | Niwa | G06F 3/0638 711/203 |

\* cited by examiner

*Primary Examiner* — Aracelis Ruiz
(74) *Attorney, Agent, or Firm* — Lowenstein Sandler LLP (57) ABSTRACT

A command pertaining to a non-volatile memory device on a memory sub-system is received from a host system. A portion of the non-volatile memory device has an association with the host system. In response to determining that the command is a dissociate instruction to dissociate the portion of the non-volatile memory device on the memory sub-system with the host system, remove the association of the portion of the non-volatile memory device on the memory sub-system with the host system.

18 Claims, 4 Drawing Sheets

DISASSOCIATING MEMORY UNITS WITH A HOST SYSTEM

TECHNICAL FIELD

Embodiments of the disclosure relate generally to memory sub-systems, and more specifically, relate to disassociating memory units in a memory sub-system with a host system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system that includes a memory sub-system, in accordance with some embodiments of the present disclosure.

FIG. 2 is a flow diagram of an example method for removing an association of a portion of a non-volatile memory device or volatile memory device on a memory sub-system with a host system, in accordance with some embodiments of the present disclosure.

FIG. 3 is a flow diagram of an example method for disassociating a portion of a non-volatile memory device or volatile memory device on a memory sub-system, in accordance with some embodiments of the present disclosure FIG. 4 is a block diagram of an example computer system in which embodiments of the present disclosure can operate.

DETAILED DESCRIPTION

Aspects of the present disclosure are directed to disassociating memory units in a memory sub-system with a host system.

A host system includes main memory and secondary memory. The main memory typically used to store data or information temporarily, whereas secondary memory usually refers to external storage devices that are used to store data or information permanently. Generally, when a host system is running an application, the necessary application and data are copied from a secondary memory into main memory. That is, the host system's main memory stores the data that the host system processor is actively using. A host system's main memory is local volatile memory device, such as DRAM on the host system, and can store data and instructions for applications that the host system is actively processing. Applications running on the host system can allocate and deallocate memory in the main memory volatile device using well-known programming commands. When an application deallocates memory in the main memory volatile device, the data stored in that memory is lost.

Some host systems may use persistent, non-volatile memory devices as main memory. Examples of a non-volatile memory device are a negative-and (NAND) memory device and a three-dimensional (3D) cross-point device, which are described in greater below in conjunction with FIG. 1. The non-volatile memory devices can be part of the host system and/or can be part of a memory sub-system that is coupled to the host system. A memory sub-system can be a storage device, a memory module, or a combination of a storage device and memory module. Examples of storage devices and memory modules are described below in conjunction with FIG. 1.

Each of the non-volatile memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. Various memory access operations can be performed on the memory cells. Data can be written to, read from, and erased from memory cells. Memory cells can be grouped into a write unit, such as a page. For some types of memory devices, a page is the smallest write unit. A page can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A page that does not contain data includes a page that has been previously erased, and not yet written to.

Generally, the non-volatile memory devices can be written to, read from, and/or erased a finite number of times before physical wear causes the non-volatile memory devices to become unreliable and fail. A memory sub-system can use media management operations to organize and maintain data on the non-volatile memory devices to reduce the wear and to improve the memory device reliability. The media management operations include read and write operations, which are initiated by a memory sub-system controller, to move valid data to different locations on the memory devices. The additional writes that result from moving valid data from one location to another location for media management create a phenomenon referred to as write amplification, where the actual amount of data physically written to the memory devices is a multiple of the logical amount intended to be written. The memory sub-system includes a memory sub-system controller that can communicate with the memory devices to perform operations such as reading data, writing data, or erasing data at the memory devices and other such operations. A memory sub-system controller is described in greater below in conjunction with FIG. 1. Volatile memory devices, such as DRAM, typically do not require media management operations because the data is lost as the memory devices lose power.

In order to successfully execute these media management operations, the memory sub-system controller keeps track of what data is valid or invalid. However, well-known programming commands traditionally used to deallocate (and hence mark as invalid) memory in DRAM main memory devices do not allow for the host system to communicate to the memory sub-system controller that the host system has finished using data stored on the non-volatile memory devices managed by the memory sub-system controller. Because traditional DRAM main memory does not use media management operations, there is no need for the host to communicate to the memory sub-system controller that the data is invalid. Current deallocation commands for DRAM do not effectually transmit the deallocation instruction to the memory sub-system controller. As a result, data that the host system does not need can be persistently stored on the non-volatile memory devices being used as main memory. This persistently stored data can be treated as valid, for example, during the media management operations, resulting in unnecessary write amplification and undue wear on the non-volatile memory devices.

Aspects of the present disclosure address the above and other deficiencies by having a memory sub-system that can identify non-volatile memory units of a memory sub-system, which are used by a host system as main memory, and disassociate the identified memory units of the memory sub-system from the host system. In one embodiment, a memory unit can be a memory page. In other embodiments, the memory unit can be some other segment of memory device. Other types of segments are described in greater detail below in conjunction with FIG. 1. The memory sub-system can receive a command from the host system and analyze the command to identify which memory units can be disassociated with the host system. In one embodiment, the memory sub-system marks the identified memory units as no longer storing valid data to disassociate the memory units with the host system. Other embodiments for disassociating memory units are described below in greater detail in conjunction with FIG. 1.

The command can specify the address and length of the memory to disassociate with the host system. In an embodiment, the command can be a new command designed specifically to disassociate memory units storing data that the host system does not need. The address and length of the memory can be specified in the new command's parameters.

In an alternative embodiment, the command received from the host can be a traditional write command that the memory sub-system can recognize as an instruction to disassociate memory units storing unused data. The write command can include a logical address and a payload. The memory sub-system can determine, based on the logical address, that the write command is intended as an instruction to disassociate memory units. The memory sub-system can identify, from the payload, the specific address and length of the memory to disassociate with the host.

Advantages of the present disclosure include, but are not limited to, improved performance and endurance of the memory devices. Invalidating unused memory units can reduce the bandwidth used by the memory sub-system controller when performing media management operations. Reducing the number of memory units included in the media management operations reduces the number of unnecessary writes executed by the memory sub-system controller, resulting in improved lifespan of the memory devices. Hence, aspects of the present disclosure can result in memory devices that use less power, perform better, and last longer. Finally, aspects described in the present disclosure can improve security measures because data that is no longer needed by the host system can be overwritten.

Figure 1:
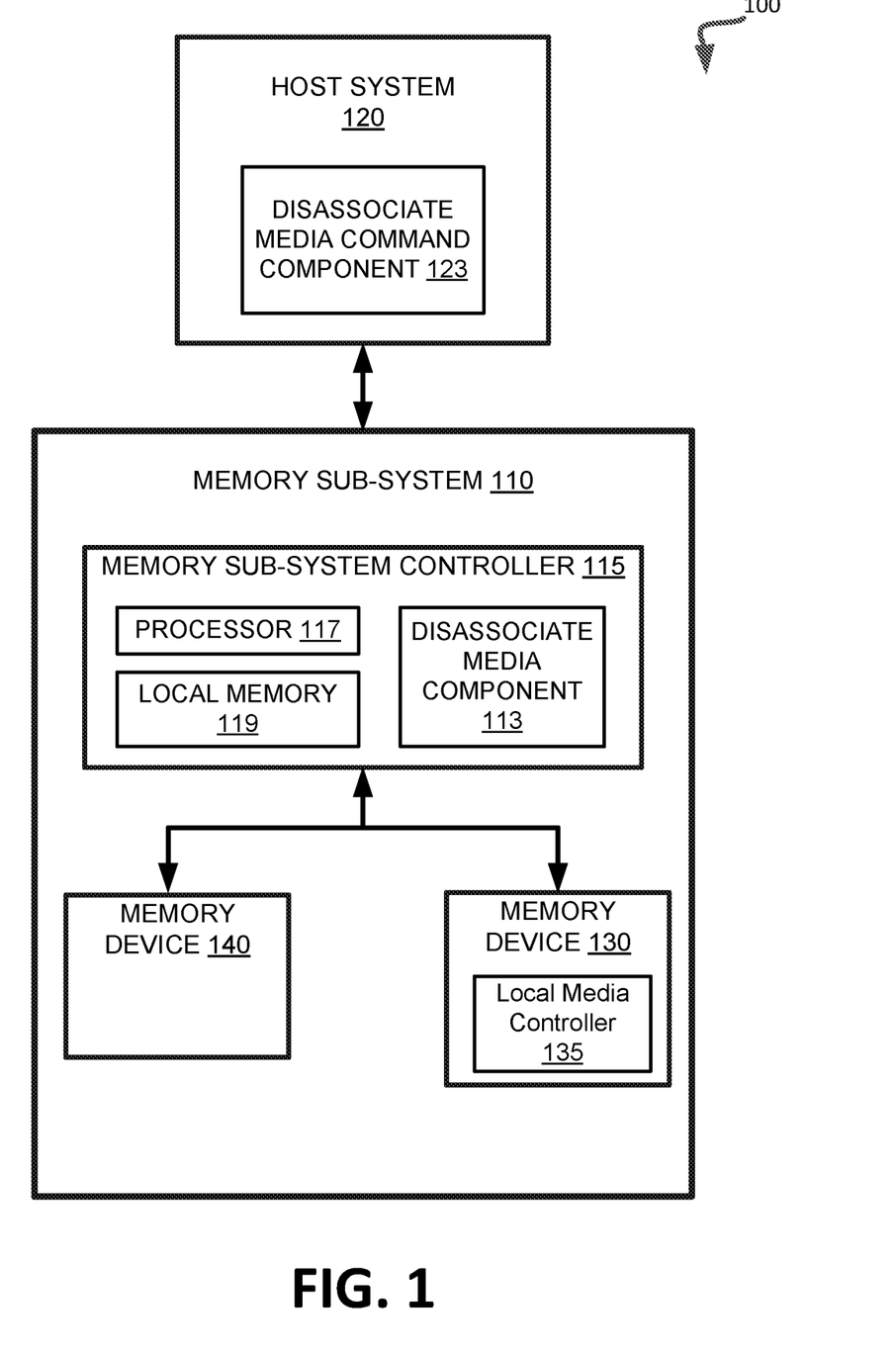

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secured digital (SD) card, and a hard disk drive (HDD). Examples of memory modules include a dual in-line memory module (DIMM), a small outline DIMM (SO-DIMM), and various types of non-volatile dual in-line memory modules (NVDIMIMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The host system 120 can use one or more memory units in one or more non-volatile memory devices 130 or volatile memory devices 140 on the memory sub-system 110 as main memory for the host system 120. In one embodiment, a memory unit is a memory page. In other embodiments, the memory unit is some other segment of memory device 130 or memory device 140.

In some embodiments, the host system 120 includes a disassociate media command component 123. The host system 120, through the disassociate media command component 123, can send a command to the memory sub-system 110 to inform the memory sub-system 110 of memory units on a non-volatile memory device 130 or volatile memory devices 140 that can be disassociated as main memory of the host system 120. The data on the disassociated memory units can be excluded from media management operations (e.g., garbage collection) performed on non-volatile memory devices 130.

The memory sub-system 110 includes a disassociate media component 113 that can receive command(s) from the host system and analyze the command(s) to identify memory units of the non-volatile memory devices 130 and/or volatile memory devices 140 of the memory sub-system 110, which are used by a host system 120 as main memory and no longer needed by the host system 120. In some embodiments, the memory sub-system controller 115 includes at least a portion of the disassociate media component 113. In some embodiments, the disassociate media component 113 is part of the host system 110, an application, or an operating system.

The command from the host system 120 can be a write command or a disassociate media command. A disassociate media command is a new command designed specifically to disassociate memory units in a non-volatile memory device 130 that the host system has finished using. The disassociate media command can be included in the host system's and memory sub-system controller's instruction set architecture.

When the command is a write command, the disassociate media component 113 can determine whether the write command is an instruction to perform a write operation or an instruction to disassociate memory unit(s) on the memory sub-system 110 from the host system 120. The write command can include an instruction parameter as an indicator to the memory sub-system 110 that the write command in an instruction to disassociate memory units in a non-volatile memory device 130 and/or volatile memory device 140 that are no longer needed by the host system 120. In one embodiment, the host system 120 sends a write command with the instruction parameter to the memory sub-system 110 upon determining that the host system 120 does not need to access certain data being stored in the memory sub-system 110. The instruction parameter can be a logical address, hereinafter also referred to as an "instructional logical address."

The disassociate media component 113 can receive a range of logical addresses from the host system 120. The range of logical addresses indicates the logical addresses that the host system 120 can access as main memory. The logical addresses correspond to physical addresses of memory devices 130 and/or memory devices 140 on the memory sub-system 110.

The host system 120 can transmit the range of logical addresses to the memory sub-system 110, for example, during system initialization (e.g., during a booting process). The host system 120 can update the range of logical addresses as needed, and/or can update the range of logical addresses on a pre-defined scheduled. Alternatively, or additionally, the host system 120 can update the range of logical addresses on a pre-defined scheduled, for example every ten minutes, or every two days.

In one embodiment, the memory sub-system controller 115 can request a range of logical addresses from the host system 120 or can request an updated range of logical addresses. In one embodiment, the range of logical addresses is stored in memory (e.g., local memory 119, memory device 140, or memory device 130 of FIG. 1). The range can be stored as an array, a linked list, a table, or some other type of data structure.

The disassociate media component 113 can use the instructional logical address in the write command and the range of logical addresses to determine whether the write command is an instruction to perform a write operation or an instruction to disassociate memory unit(s) from the host system 120. Determining whether the write command is a write instruction or a disassociating instruction using the instructional parameter and range of logical addresses is described in greater detail below in conjunction with FIG. 2 and FIG. 3.

Returning to FIG. 1, upon determining that a command received from the host system 120 is a disassociate media command or is a write command intended as an instruction to disassociate memory unit(s) from the host system 120, the disassociate media component 113 can identify the memory unit(s) on the memory sub-system 110 to be disassociated.

A command (e.g., disassociate media command, write command) can include payload parameters to indicate to the memory sub-system 110 which memory units are storing data that the host system 120 has finished using. The payload parameters can include a starting logical address and a length. The starting logical address indicates the start location of the memory units storing data that is no longer needed by the host system 120, and the length indicates how much of the memory units are to be disassociated.

The disassociate media component 113 can determine the physical address of the memory units (e.g., memory pages) associated with the starting logical address and the length. The disassociate media component 113 can use a logical-to-physical (L2P) mapping data structure (e.g., a L2P table), for example, to identify the physical addresses of the memory units associated with the starting logical address and length.

The disassociate media component 113 can disassociate the identified memory units from the host system 120. In one embodiment, the disassociate media component 113 disassociates memory units from the host system by marking the memory units as no longer storing valid data. The disassociate media component 113 can disassociate, or invalidate, memory units by setting an indicator bit associated with each memory unit to invalid. In another embodiment, the disassociate media component 113 disassociates the memory units from the host system 120 by overwriting the data that is stored in the identified memory units. In some embodiments, for example when using non-volatile memory devices 130 that allow for in-place writes (e.g., 3D cross-point memory devices), the disassociate media component 113 can overwrite the memory units (e.g., memory pages) with a default set of data to ensure that the data is no longer accessible. The default set of data represents random data that is used to overwrite data. The default set of data can be randomly generated data, or can be all zeros, for example. In another embodiment, the disassociate media component 113 disassociates the memory units from the host system by invalidating the data and overwriting the data in the identified memory units. Disassociating the memory units from the host system is described in greater detail below in conjunction with FIG. 2 and FIG. 3.

The memory sub-system controller 115 can exclude data on the disassociated memory units from media management operations (e.g., garbage collection, wear leveling) performed on non-volatile memory devices 130. For example, the memory sub-system controller 115 can reclaim the disassociated memory pages when executing a garbage collection operation. In another example, when executing a wear leveling operation, the memory sub-system controller 115 can overlook the disassociated memory pages, thus avoid unnecessary rewrites of unused data. Further details with regards to the operations of the disassociate media component 113 are described below.

Figure 2:
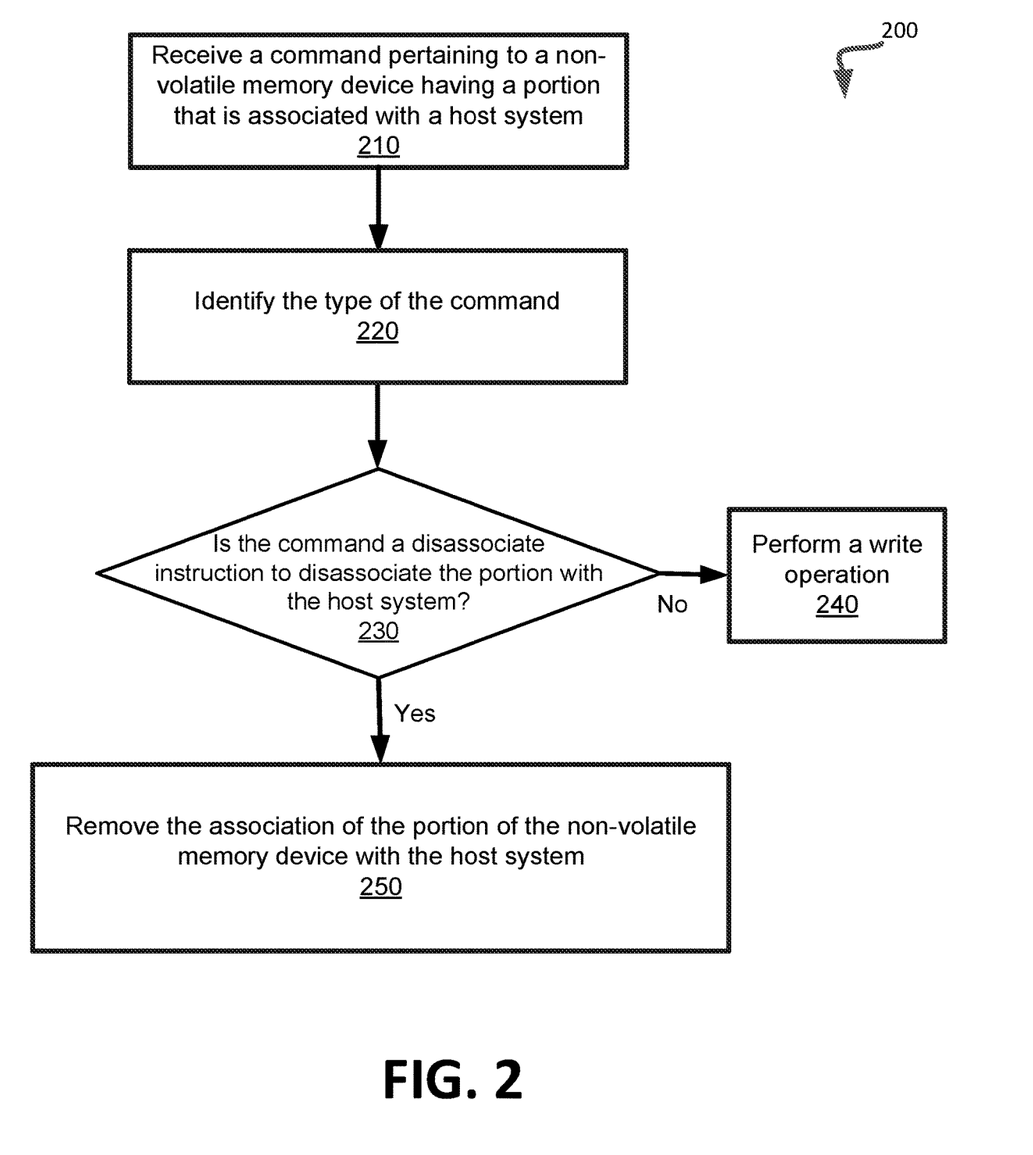

FIG. 2 is a flow diagram of an example method 200 for removing an association of a portion of a non-volatile memory device or volatile memory device on a memory sub-system with a host system, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the disassociate media component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic receives, from a host system, a command pertaining to a non-volatile memory device on a memory sub-system. A portion of the non-volatile memory device has an association with the host system. The portion can be one or more memory units. The processing logic can receive multiple such commands and can store them in a queue awaiting subsequent execution.

At operation 220, the processing logic identifies a command type for the command. The command type can be a write command or a disassociate media command. The command can include a logical address and a payload.

At operation 230, the processing logic determines, based on the command type, whether the command is a dissociate instruction to disassociate the portion of the non-volatile memory device on the memory sub-system with the host system.

If the processing logic identifies (at operation 220) that the command type is a disassociate media command, the processing logic determines that the command is a dissociate instruction at operation 230, and removes the association of the portion of the non-volatile memory device on the memory sub-system with the host system at operation 250. Removing the association is described in greater detail below in conjunction with FIG. 3.

If the processing logic identifies (at operation 220) that the command type is a write command, the processing logic compares the logical address specified in the write command to a range of logical addresses. If the logical address specified in the write command is within the logical address range, the processing logic determines that the write command is not a dissociate instruction and is an instruction to write data to the non-volatile memory device. At operation 240, the processing logic performs a write operation. The command can include a payload. The payload can include user data, such as one or more parameters, and is generally separate from control information (e.g., the first logical address) in the write request. The processing logic executes the write command by writing the user data in the payload to a memory device in the memory sub-system. The processing logic can update a L2P mapping data structure (e.g., L2P table) by mapping the logical address specified in the write command to the physical address of the memory units to which the payload was saved.

If the logical address specified in the write command is outside the logical address range, the processing logic determines (at operation 230) that the write command is a dissociate instruction, and at operation 250, removes the association of the portion of the non-volatile memory device on the memory sub-system with the host system. Removing the association is described in greater detail below in conjunction with FIG. 3.

The processing logic can exclude the one or more memory units from media management operations performed in the memory sub-system, such as garbage collection and/or wear leveling. For example, the processing logic can initiate a media management operation and examine the indicator(s) associated with the memory units to determine whether the memory unit is storing valid or invalid data. If the memory unit is not storing valid data, the processing logic can exclude the memory unit from the media management operations, such as garbage collection and/or wear leveling.

Figure 3:
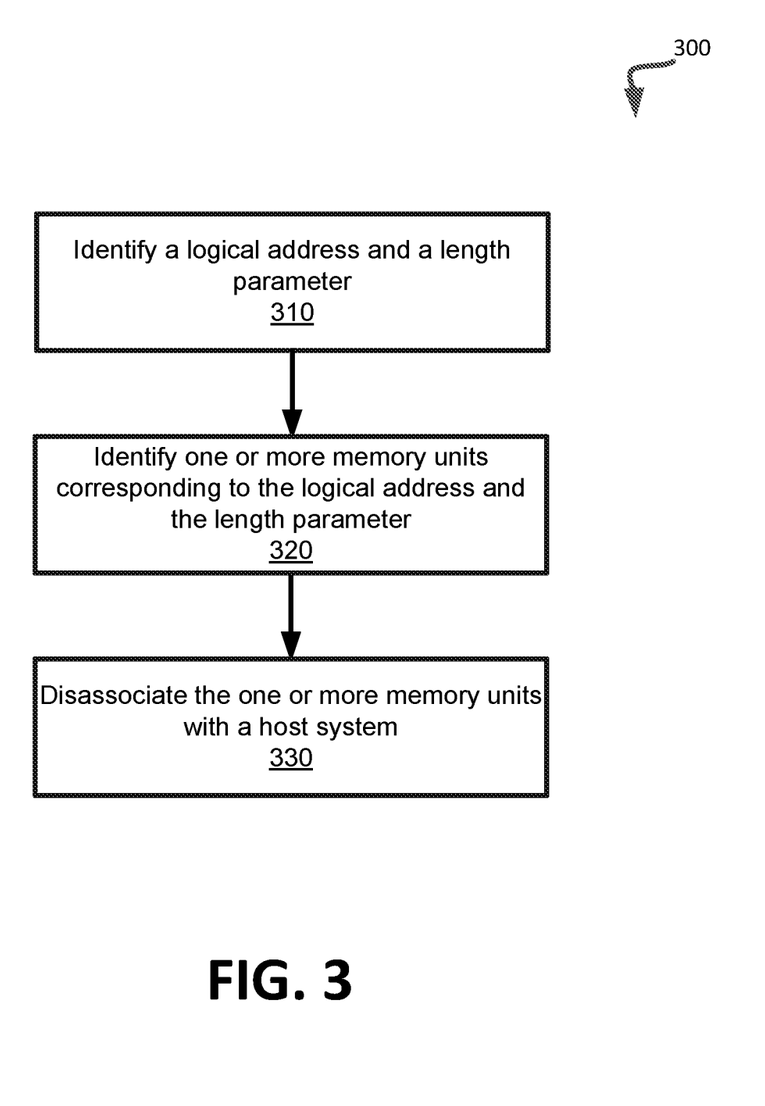

FIG. 3 is a flow diagram of an example method 300 for disassociating a portion of a non-volatile memory device or volatile memory device on a memory sub-system with a host system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the disassociate media component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic identifies a starting logical address and length parameter. The processing logic can identify the starting logical address and length parameter from a payload in a command. The starting logical address and length can represent the location of the data to disassociate with the host system. The starting logical address can indicate the start address of the memory units in the memory sub-system storing data no longer needed by the host, and the length can indicate the amount of the data no longer needed.

At operation 320, the processing logic identifies one or more memory units corresponding to the starting logical address and length parameter. The processing logic can determine a physical address corresponding to the starting logical address and can identify the one or more memory units corresponding to the physical address and the length. The processing logic can use the starting logical address and length parameter and a logical-to-physical mapping structure (e.g., L2P table) to determine the physical addresses. The processing logic determines a physical address corresponding to the starting logical address, essentially translating the starting logical address into a physical address. The processing logic uses the length parameter to identify the one or more memory units corresponding to the physical address.

At operation 330, the processing logic disassociates the memory units with the host system. In one embodiment, the processing logic disassociates the memory units by invalidating data that is stored on the one or more memory units corresponding to the starting logical address and length parameter. In another embodiment, the processing logic disassociates the memory units by overwriting data that is stored on the on the one or more memory units corresponding to the starting logical address and length parameter. In another embodiment, the processing logic invalidates the data and overwrites data that is stored on the on the one or more memory units corresponding to the starting logical address and length parameter.

The processing logic can set an indicator associated with the one or more memory units to indicate that the data stored in the one or more memory units is invalid. The indicator can store a bit value, which can be either 0 or 1 for example, indicating whether the corresponding memory unit (e.g., memory page) contains valid data. The bit indicator can be metadata that is part of the memory unit (e.g., memory page). Alternatively, or additionally, the bit indicator for each memory unit (e.g., page) can be stored in a separate data structure (e.g., a table, a list, etc.) and referenced by the memory unit.

The processing logic can adjust the value of the bit indicator based on information received from the host system. If the bit indicator is set to valid, the corresponding memory unit (e.g., memory page) can be treated as storing valid data during the memory sub-system's media management operations, such as garbage collection or wear leveling. If the bit indicator is set to invalid, the corresponding memory unit (e.g., memory page) can be treated as storing invalid data during the memory sub-system's media management operations.

For example, during garbage collection, the memory sub-system controller can save the memory pages that have a corresponding bit indicator set to valid and can reclaim the memory pages that have a corresponding bit indicator set to invalid. Invalidating memory units that contain data no longer needed by the host system can reduce overall write amplification, as the memory sub-system controller will no longer be copying and saving unused data during garbage collection. Furthermore, during wear leveling, the memory sub-system controller can redistribute the memory units that have a corresponding bit indicator set to valid. Setting the bit indicator to invalid indicates to the memory sub-system controller that the corresponding memory unit is free to be erased and/or rewritten.

Figure 4:
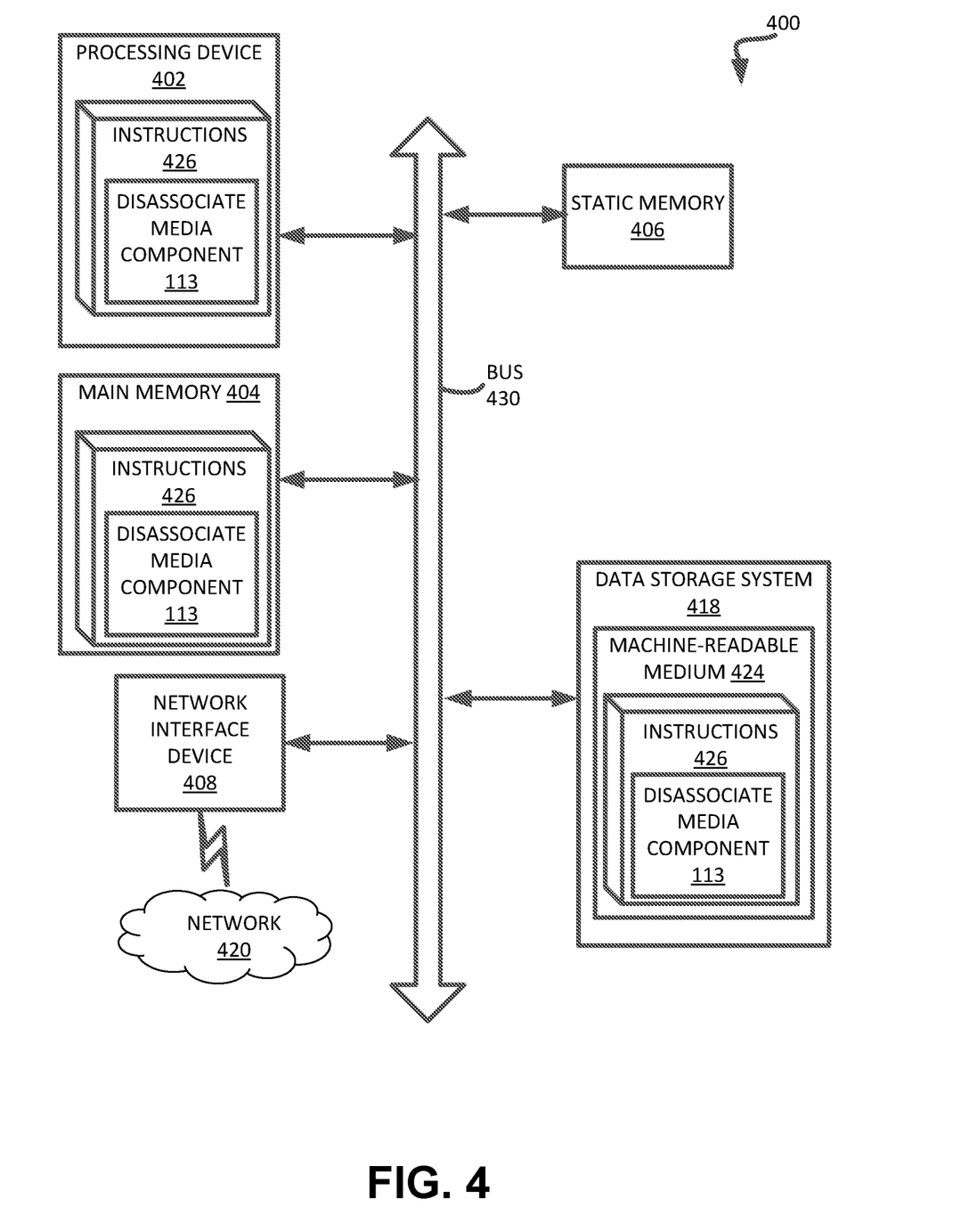

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the disassociate media component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a disassociate media component (e.g., the disassociate media component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, from a host system, a command pertaining to a non-volatile memory device on a memory sub-system, wherein a portion of the non-volatile memory device has an association with the host system, and wherein the command comprises a logical address;
in response to determining that the logical address is not within a range of logical addresses associated with the host system, determining that the command is a dissociate instruction to dissociate the portion of the non-volatile memory device on the memory sub-system with the host system; and
in response to determining that the command is the dissociate instruction, removing the association of the portion of the non-volatile memory device on the memory sub-system with the host system.

2. The method of claim 1, further comprising:
overwriting the portion of the non-volatile memory device with a default set of data.

3. The method of claim 1, further comprising:
receiving, from the host system, the range of logical addresses associated with the host system, the range of logical addresses indicating logical addresses that the host system can access.

4. The method of claim 1, wherein removing the association of the portion of the non-volatile memory device comprises:
identifying a payload specified in the command;
identifying a starting logical address and a length parameter from the payload;
identifying one or more memory units corresponding to the starting logical address and the length parameter; and
setting an indicator associated with the one or more memory units to indicate that the one or more memory units are invalid.

5. The method of claim 4, wherein identifying one or more memory units corresponding to the starting logical address and the length parameter comprises:
determining a physical address corresponding to the starting logical address; and
identifying one or more memory units corresponding to the physical address and the length parameter.

6. The method of claim 4, wherein setting the indicator associated with the one or more memory units comprises:
setting a bit associated with each of the one or more memory units to a value indicating that a corresponding memory unit is invalid.

7. The method of claim 1, further comprising:
initiating a media management operation;
examining an indicator associated with one or more memory units to determine whether each corresponding memory unit is valid; and
in response to determining that the corresponding one or more memory units are not valid, excluding the one or more memory units from a media management operation performed in the memory sub-system.

8. The method of claim 1, further comprising:
in response to determining that the command is not the dissociate instruction, identifying a logical address and a payload in the command; and
writing data indicated in the payload to a memory unit associated with the logical address.

9. A non-transitory computer-readable storage medium comprising instructions that, when executed by a processing device, cause the processing device to perform operations comprising:
receiving, from a host system, a command pertaining to a non-volatile memory device on a memory sub-system, wherein a portion of the non-volatile memory device has an association with the host system, and wherein the command comprises a logical address;
in response to determining that the logical address is not within a range of logical addresses associated with the host system, determining that the command is a dissociate instruction to dissociate the portion of the non-volatile memory device on the memory sub-system with the host system;

in response to determining that the command is the dissociate instruction, removing the association of the portion of the non-volatile memory device on the memory sub-system with the host system.

10. The non-transitory computer-readable storage medium of claim 9, wherein the processing device is to perform operations further comprising:
  overwriting the portion of the non-volatile memory device with a default set of data.

11. The non-transitory computer-readable storage medium of claim 9, wherein the processing device is to perform operations further comprising:
  receiving, from the host system, the range of logical addresses associated with the host system, the range of logical addresses indicating logical addresses that the host system can access.

12. The non-transitory computer-readable storage medium of claim 9, wherein removing the association of the portion of the non-volatile memory device comprises:
  identifying a payload specified in the command;
  identifying a starting logical address and a length parameter from the payload;
  identifying one or more memory units corresponding to the starting logical address and the length parameter; and
  setting an indicator associated with the one or more memory units to indicate that the one or more memory units are invalid.

13. The non-transitory computer-readable storage medium of claim 9, wherein the processing device is to perform operations further comprising:
  initiating a media management operation;
  examining an indicator associated with one or more memory units to determine whether each corresponding memory unit is valid; and
  in response to determining that the corresponding one or more memory units are not valid, excluding the one or more memory units from a media management operation performed in the memory sub-system.

14. The non-transitory computer-readable storage medium of claim 9, wherein the processing device is to perform operations further comprising:
  in response to determining that the command is not the dissociate instruction, identifying a logical address and a payload in the command; and
  writing data indicated in the payload to a memory unit associated with the logical address.

15. A system comprising:
a memory device; and
a processing device, operatively coupled with the memory device, to perform operations comprising:
  receiving, from a host system, a command pertaining to a non-volatile memory device on a memory sub-system, wherein a portion of the non-volatile memory device has an association with the host system, and wherein the command comprises a logical address;
  in response to determining that the logical address is not within a range of logical addresses associated with the host system, determining that the command is a dissociate instruction to dissociate the portion of the non-volatile memory device on the memory sub-system with the host system; and
  in response to determining that the command is the dissociate instruction, removing the association of the portion of the non-volatile memory device on the memory sub-system with the host system.

16. The system of claim 15, wherein the processing device is to perform operations comprising:
  receiving, from the host system, the range of logical addresses associated with the host system, the range of logical addresses indicating logical addresses that the host system can access.

17. The system of claim 15, wherein removing the association of the portion of the non-volatile memory device, the processing device is to perform operations comprising:
  identifying a payload specified in the command;
  identifying a starting logical address and a length parameter from the payload;
  identifying one or more memory units corresponding to the starting logical address and the length parameter; and
  setting an indicator associated with the one or more memory units to indicate that the one or more memory units are invalid.

18. The system of claim 15, wherein the processing device is to perform operations further comprising:
  initiating a media management operation;
  examining an indicator associated with one or more memory units to determine whether each corresponding memory unit is valid; and
  in response to determining that the corresponding one or more memory units are not valid, excluding the one or more memory units from a media management operation performed in the memory sub-system.

* * * * *